(12) United States Patent
Fleming

(10) Patent No.: US 6,370,782 B1
(45) Date of Patent: Apr. 16, 2002

(54) STABILIZING BOW SAW HANDLE EXTENSION

(76) Inventor: Samuel H. Fleming, 18 Westridge Dr., Asheville, NC (US) 28803

(*) Notice: Subject to any disclaimer, the term of this patent is extended or adjusted under 35 U.S.C. 154(b) by 0 days.

(21) Appl. No.: 09/578,599

(22) Filed: May 25, 2000

(51) Int. Cl.[7] .............................................. B23D 51/01
(52) U.S. Cl. ...................................................... 30/517
(58) Field of Search ......................... 30/507, 517, 509, 30/519, 520, 340

(56) References Cited

U.S. PATENT DOCUMENTS

| | | | | |
|---|---|---|---|---|
| 60,924 A | * | 1/1867 | Morris | 30/517 |
| 920,414 A | * | 5/1909 | Batchlor | 30/508 |
| 1,429,195 A | * | 9/1922 | Donaldson | 30/512 |
| 2,014,722 A | * | 9/1935 | Damon | 30/517 X |
| 2,615,485 A | * | 10/1952 | Canter | 30/517 X |

* cited by examiner

Primary Examiner—Douglas D. Watts
(74) Attorney, Agent, or Firm—John B. Hardaway, III; Nexsen Pruet Jacobs & Pollard, LLC

(57) ABSTRACT

This invention describes an improved bow saw having a stabilizing elongated handle extension comprising a connecting device and elongated handle. The handle extension is positioned and secured at one of several angles onto the bow portion of a bow saw. It is useful for a full range of vegetation removal and upkeep and it affords greater ease of cutting for tree trunks and low lying branches and brush.

1 Claim, 2 Drawing Sheets

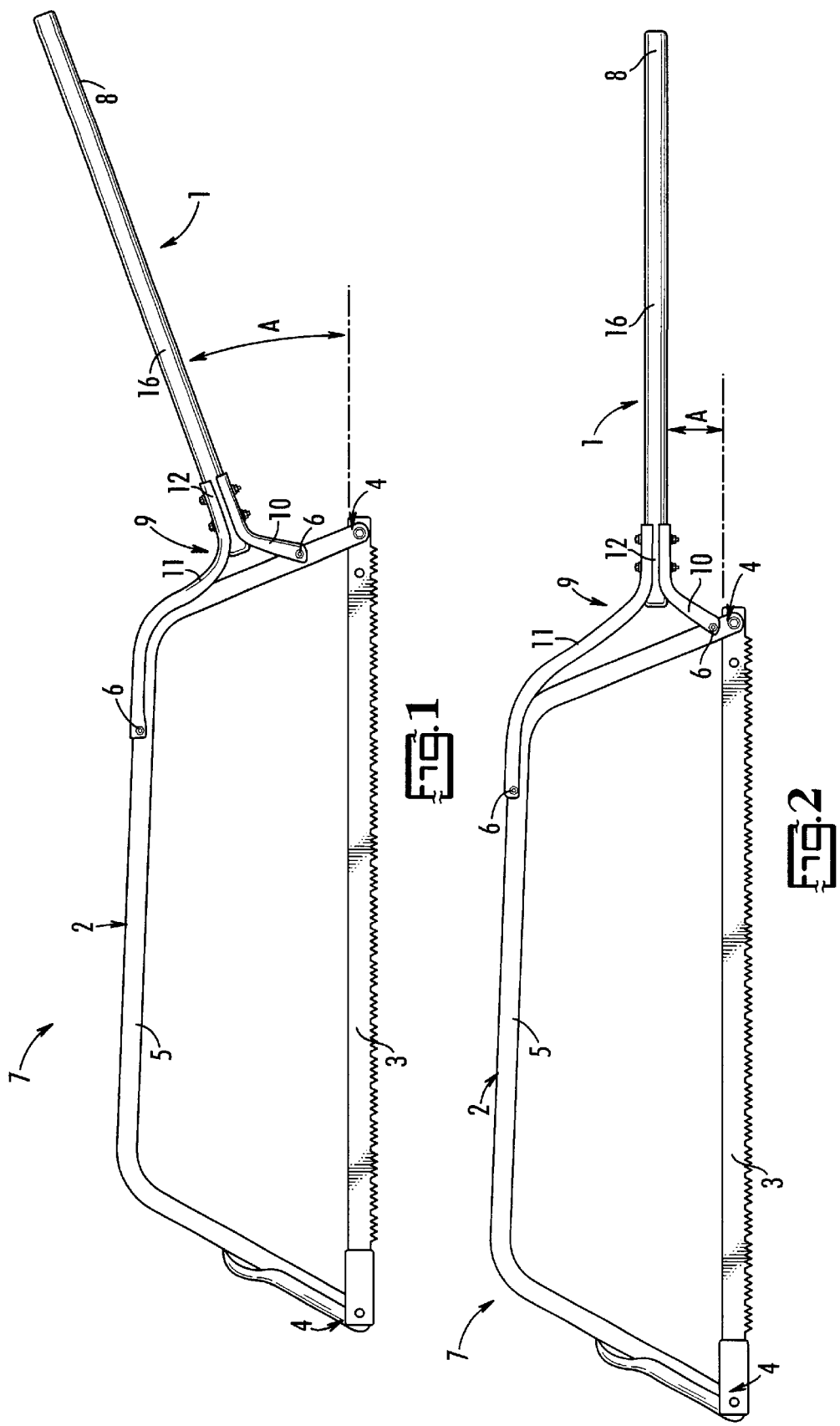

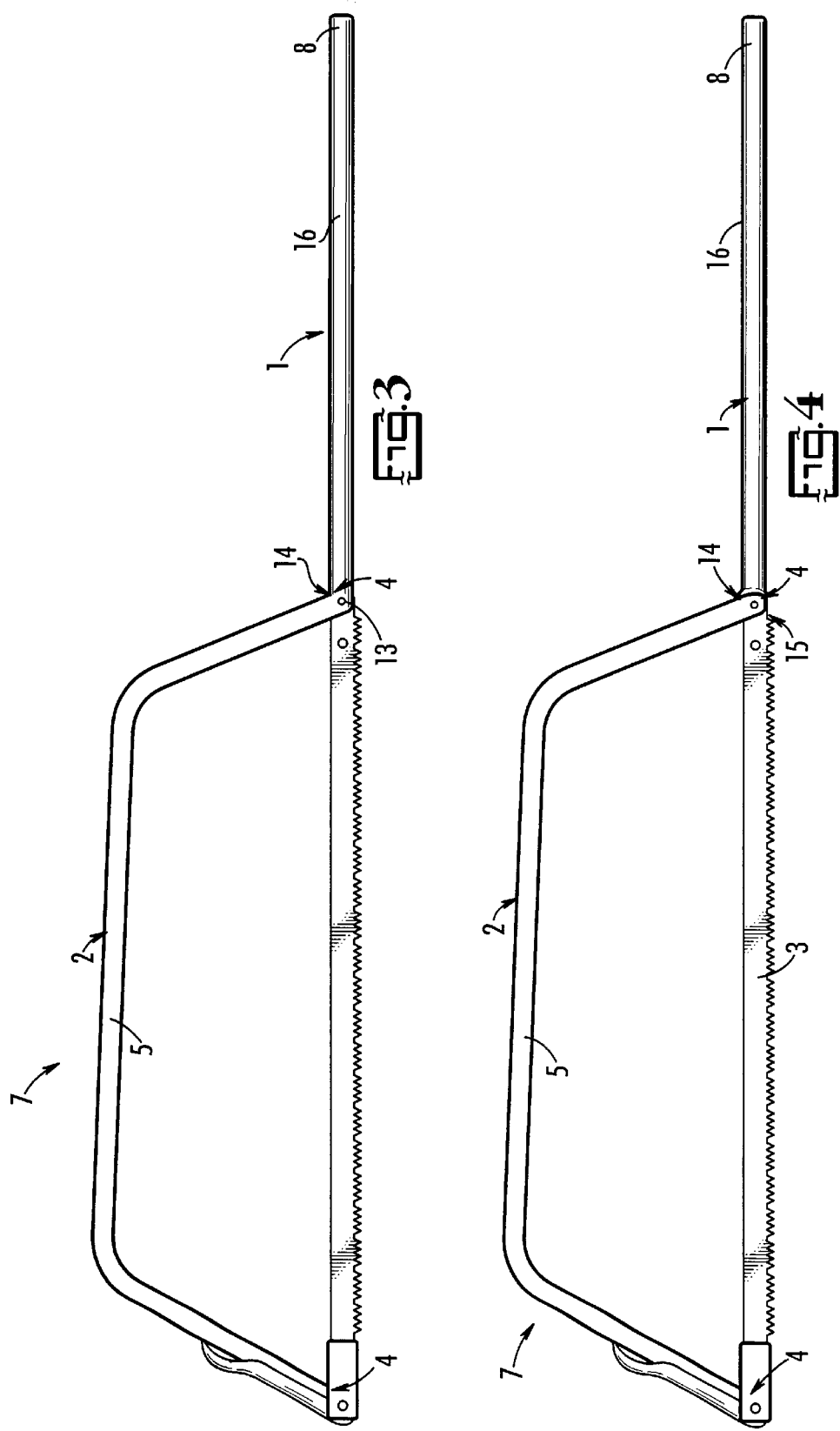

STABILIZING BOW SAW HANDLE EXTENSION

BACKGROUND OF THE INVENTION

The present invention relates generally to an improved bow saw and handle. Specifically, the present invention is directed to a bow saw having a stabilizing handle extension connected to the bow of a bow saw.

Traditional hand-held cutting saws can be extremely efficient in cutting logs, tree-limbs, and small tree trunks. This requires that the user possess a sufficient combination of strength, speed, and dexterity to obtain a rhythm as he/she applies multiple cutting strokes. Without such skill or strength, at each stroke the user is apt to experience stoke interference, resistance, or in some cases, even complete stoppage. In the latter case, that is—when the blade is momentarily lodged in the wood mid-stroke, the user must begin a new series of strokes, or otherwise attempt to regain his/her stroke rhythm. Such stoppage stems from at least two problems that the present invention eliminates, or at the very least, substantially minimizes.

The first problem which typically causes mid-stroke stoppage is angular saw movement transverse to stroke direction. While in mid stroke, a user not having sufficient skill will allow the entire saw to bend from side-to-side. With traditional hand-held bow saws, the user grips the bow to create a hinge of sorts, such that the saw deviates from one side to the other with respect to the user's hands and the direction of cutting. This tendency persists with all saws not having an appropriately designed extension.

The second of these problems that typically causes a saw blade to "catch" is a lack of constantly applied stroke force. Even where the user succeeds in maintaining a series of strokes all in a single direction so as to eliminate the above-mentioned "hinge" effect, some users are unable to supply constant force for effective follow through. This also gives rises to mid-stroke blade stoppage because the user does not supply a constant amount of force throughout the entire stroke. Thus, the present invention provides a more stable saw that evenly distributes cutting force through-out the entire cutting stroke.

The present invention also envisions the use of an elongated handle. As such, the present invention is especially useful for brush clearing and for cutting Christmas trees. Usually, Christmas trees must be cut while stooping down, or while the saw user is on his/her hands and knees. This is something to be avoided, especially when the ground at the foot of a tree is covered with snow, slush and/or mud.

DESCRIPTION OF RELATED ART INCLUDING INFORMATION DISCLOSED UNDER 37 CFR 1.97 AND 37 CFR 1.98

Several U.S. Patents disclose various saws having elongated handles, but none specifically provide features to stabilize each cutting stroke first, by eliminating transverse movement caused by pivotal handle movement and second, by evenly distributing stroke force.

U.S. Pat. No. 1,771,664 teaches an improved pruning and tree topping saw comprising a carrier bow including a cylindrical stock bolted and secured by an embracing band to an extension handle. It is purposely designed to position the handle extension parallel to the blade so as to permit tree top cutting. It does not mention or suggest a handle or bracket that stabilizes the saw's cutting stroke.

U.S. Pat. No. 1,868,349 teaches a tree trimmer comprising a resilient bow and a bracket for connecting a handle thereto. It does not mention or suggest a handle or bracket that stabilizes saw cutting stroke.

U.S. Pat. No. 1,697,088 discloses a trimming tool having a pipe handle extension connected to a foliage trimming saw frame via a T-shaped fitting. As such, the above-mentioned references do not disclose devices that stabilize saw cutting stroke.

U.S. Pat. No. 3,602,278 teaches a hacksaw frame which has an elongated bar, integrated handle, and a pivotal link for cutting bolts. Although it is designed to provide an angled handle and blade relationship which gives more effective cutting or "dig" by virtue of the slight angular positioning of its handle with respect to its blade, it does not stabilize cutting stroke. For example, it neither provides features that eliminate transverse movement caused by pivotal handle movement, nor evenly distributes stroke force for the duration of the stroke.

Other devices such as U.S. Pat. No. 920,414 issued to Batchlor, provide a handle connected to both a medial portion and end portion of a saw frame. This device provides limited cutting stability, however. Due to transverse movement caused by pivotal handle movement it tends to swing from side-to-side.

Moreover, like the other above-mention references, it does not provide any features which evenly distribute stroke force along the duration of the stroke. As with the above-mentioned references, the cutting efficacy of this device relies heavily on the skill of the user. As such, the user must provide a consistent cutting force through-out the stroke, or otherwise be faced with the unpleasant experience of having the saw blade stopping mid-stroke. The user then must begin sawing again to re-establish a rhythm.

Clearly, there is room for improvement in the art.

SUMMARY OF THE INVENTION

Therefore, it is an object of the present invention to provide a more stable bow saw that allows smoother and easier cutting, as well as improved access to low lying wood, brush, and tree trunks.

It is a further object of the present invention to provide a bow saw allowing improved cutting efficiency by evenly distributing stroke force.

It is a further object of the present invention to provide a bow saw allowing improved cutting efficiency by eliminating transverse movement caused by transverse blade movement with respect to a user's hands.

It is a further object of the present invention to provide a bow saw with the foregoing improvements using pre-existing, and therefore less expensive, basic components.

These and other objects are achieved in one aspect of the present invention by providing a bow saw comprising a bow having a medial section and two ends, each end connected to the medial section; a blade attached to the bow at each said end; a connecting device; and an elongated handle connected to the bow by the connecting device; wherein the connecting device minimizes transverse movement of the blade and the bow, and wherein the connecting device evenly distributes stroke force throughout each stroke.

These and other objects are achieved in a second aspect of the present invention by providing a stabilizing handle extension for a saw, comprising a contractable connecting device adapted to being attached to a saw having a blade; and an elongated handle attached to the connecting device; wherein the connecting device minimizes transverse movement of the blade and said bow, and wherein the connecting device evenly distributes stroke force throughout each stroke.

These and other objects are achieved in a third aspect of the present invention by providing a saw handle extension connecting device comprising a contractable member having at least one end adapted for attachment to a saw frame, and having a second end adapted to receive an elongated handle extension; wherein the contractable member is adapted to minimize transverse movement of the saw when operably connected to the saw and the elongated handle, and wherein the contractable member is adapted to evenly distribute stroke force throughout each stroke when operably connected to the saw and the elongated handle.

BRIEF DESCRIPTION OF THE DRAWINGS

The features of the present invention will become apparent to those skilled in the art to which the invention relates from reading the following specification with reference to the accompanying drawings, in which:

FIG. 1 is a perspective view of an embodiment of a bow saw in accordance with the present invention having an angled handle extension; and FIG. 2 is a perspective view of a second embodiment of a bow saw in accordance with the present invention having a handle extension parallel to the blade.

FIG. 3 is an elevation view of a third embodiment of a bow saw in accordance with the present invention.

FIG. 4 is a cut-away perspective view of the connecting device 51 and bow saw of FIG. 3.

DETAILED DESCRIPTION

In accordance with this invention it has been found that a bow saw having a stabilizing handle extension provides improved characteristics for a number of cutting applications. It is specifically useful for cutting low lying tree branches and brush. It also allows quicker, more effective harvesting of small trees such as those used as Christmas decorations. Use of the present invention eliminates the need to lean over the cutting object in order to use the full length of the cutting blade. This is especially advantageous when cutting standing or fallen trees and brush.

Accordingly, the apparatus of the present invention facilitates these tasks through the following features. The present invention envisions a bow saw having an elongated handle extension. The handle extension, which more specifically has a specialized connecting device, gives the saw stability and balance that a regular bow saw does not have. The saw handle connecting device attaches the handle extension to a bow saw, bow portion, frame, traditional handle, or base portion of a bow saw or similar saw. When attached, the handle extension comprising an elongated handle and contractable connecting device lends stability not found in related saws. As a result, particular configurations of the present invention make the saw much easier to use with one hand or by unskilled or weaker users.

More specifically, traditional hand-held cutting saws can be extremely efficient when used to cut logs, tree-limbs, and small tree trunks. This nevertheless requires that the user possess a sufficient combination of strength, speed, and dexterity to obtain a rhythm as he/she applies multiple cutting strokes. Without such skill or strength, at each stroke the user is apt to experience stoke interference, resistance. or in some cases, even complete stoppage. In the latter case, that is—when the blade is momentarily lodged in the wood mid-stroke, the user must begin a new series of strokes, otherwise attempt to regain his/her stoke rhythm. Such stoppage where a saw blade momentarily becomes caught stems from at least two problems that the present inventions eliminates, or at the very least, substantially minimizes.

The first of these problems that typically causes a saw blade to "catch" is a lack of constantly applied stroke force. Even where the user succeeds in maintaining a series of strokes all in a single direction so as to eliminate the above-mentioned "hinge" effect, that user is unable to supply constant force and follow through. This also gives rises to mid-stroke blade stoppage. Thus, the present invention provides a more stable saw that evenly distributing cutting force through-out the entirety of the cutting stroke.

To remedy this problem the apparatus of the present invention provides a stabilizing extension handle having a connecting device that is extendable and contractable, and more preferably both contractable and extendable. This connecting device comprises a reversibly contracting member having one end adapted for attachment to a saw frame, and having a second end adapted to receive an elongated handle extension. The connecting device attaches the handle to the bow frame of a bow saw to provide a resilient spring action effect which evenly transfers cutting stroke force along the entire cutting stroke. As cutting force is applied by pushing and pulling of the saw, the connection device slightly flexes to absorb part of the force being applied. When pushed away from the user as during a forward stroke, the connecting device initially contracts at the outset of the stroke to provide a slightly lessened stroke force to the object being cut. At the end of the stroke, however, this energy stored in the contacted connecting device is released to provide an extended, more even stroke finish to the forward stroke.

In the same way, during a reverse stroke, the connecting device extends as inertia temporarily holds the bow and blade portion of the apparatus in place. As the reverse stroke continues the connecting device springs back to its normal position.

It is important to select a connecting device having an appropriate elasticity, keeping the following in mind. First, if too elastic the connecting device will allow the bow and blade to pivot or swivel with respect to the handle extension. The handle extension will thus lose its usefulness in eliminating side-to-side (transverse) saw movement. Second, if too rigid, the connection device will lose its desired effect of evenly distributing cutting force along the entirety of the stroke. Therefore, optimal use of a resilient, elastic, or semi-elastic connecting device in accordance with the present invention requires an appropriate balance of elasticity and rigidity when selecting an appropriate connecting device.

The desired effect can be achieved through the use of piston-like units, including coil springs, fluid-type containers or other, elastic or movable mechanical connections. In any case, the connecting device selected should give an optimal balance of spring action and rigidity.

In a preferred embodiment, the desired effect is accomplished in part by providing a gap or other space between the handle extension and bow. This is accomplished by attaching the handle to the bow frame of a bow saw in at least two locations along the bow. The first connection is at one end of the bow. The second connection point is along the medial portion of the bow. Thus, multiple connection points affords a resilient spring action effect which evenly transfers cutting stoke force along the entire stroke.

The second problem which typically causes mid-stroke stoppage is angular saw movement transverse to the stroke direction. While in mid stroke, a user not having sufficient skill will allow the entire saw to bend from side-to-side. With traditional hand-held bow saws, the user grips the bow to create a hinge of sorts, such that the user's hand acts as a hinge allowing the saw to swing from side to the other. This effect persists with all saws not having an extension.

As such, the problem is remedied by attaching a handle extension which minimizes transverse pivotal instability. In other words, a handle extension in accordance with the present invention minimizes pivotal swing between the users hands and the saw to thus lessen side-to-side saw blade movement during use.

In a preferred embodiment then, the handle extension is designed to be held like a typical broom handle, rather than a traditional saw handle. As seen in FIG. 1, the handle extension 1 of the present invention is comprised of a handle 16 and a connecting device 9 and may also be removably attached. Alternately, the elongated handle may have an oval handle, preferably with grips, such as shown in FIG. 4.

To achieve the foregoing and other advantages, the handle extension of the present invention, as seen in FIG. 1, can be positioned at any angle away from the blade. The handle extension 1 is positioned so that the proximal end 12 of the handle 16 is connected to the bow 2 portion of a bow saw 7, while the distal end 8 of the handle 16 projects away from the bow 2 and blade 3, so that the handle extension 1 never intersects the plane defined by the blade 3. The angular positioning A of each of one or more handle extensions 1 may range from approximately 0° to 180° with respect to the blade 3. The angle A is set more preferably between about 0° and 45° relative to the blade 3.

In a preferred embodiment, the handle extension 1 of the present invention is generally made from a substantially cylindrical tool handle 16, as seen in FIGS. 1 and 2, but can be of various shapes and curvatures, as seen in FIGS. 3 and 4. It is attached to a number of types of saws using various connecting devices, such as the connecting device 9 seen in FIGS. 1 and 2, or the connecting device 51, seen in FIGS. 3 and 4.

Moreover, the elongated handle extension can be attached to the connecting device in many ways. For example, a form-fitting universal bolt-on or screw-on band clamp or similar fastener can be used.

In a preferred embodiment, the present invention is a simple bow saw 7 having a handle extension 1 comprising a handle connector device, i.e. joint 9, and an elongated handle extension 16. As seen in FIGS. 1 and 2, the handle extension 1 is fastened to the bow 2 of a saw 7 at two connections 6,21 so that force is distributed to more than one area of the bow 3. A lower connection 6 is at the end of the bow 2 or base of the saw 7, by way of a first semi-flexible support member 10 of connecting device 9 while an upper connection 21 lies further up the bow 2 connected to the handle by way of a second semi-flexible support member 11 of connecting device 9. Among other things, the second semi-flexible support member 11 of connecting device 9 of this embodiment helps maintain a downward force on the blade 3 while at the same time transferring stress away from the lower connection 6 and the bow 2. This buttressing connection not only creates better cutting efficiency, but also decreased wear at connections 6,21 of the angled embodiment shown in FIG. 1.

The preferred embodiment illustrated in FIG. 1, comprises an elongated handle extension 1 secured to a bow 2 of a conventional bow saw 7 at an angle not parallel to the blade 3. The bow 2 is attached to a blade 3 and has two ends 4 and a medial section 5 making up its ridge. The handle extension 1 is attached at two connection positions 6,21 along the bow 2. For brush cutting, the handle extension may be positioned at up to a 20° angle A with respect to the cutting line defined by the blade 3.

The embodiment shown in FIG. 1 comprises a modified wooden-handled hand threshing tool or swing blade connected to the bow 2 portion of a conventional bow saw 7. The straight substantially cylindrical handle extension 1 is about 3 feet long and is coupled to the bow 2 by a modified metal portion or connecting device 9 of a threshing tool. This metal portion, connecting device 9, has its blade as well as a segment of one prong of its metal fork removed. As such, the remaining instrument is welded to the bow saw 7. Connections 6,21 can alternatively be attached by clamps or other fasteners such as pins, screws, bolts and the like.

An alternate preferred embodiment of the present invention is illustrated in FIG. 2. It comprises an elongated handle extension 1 secured to a bow 2 and positioned at an angle A parallel to the blade 3. The elongated handle extension 1 is also made from the attachment or connecting device 9 of a standard hand tool handle to a. conventional bow saw 7 via a modified metal portion. As seen, this embodiment illustrated in FIG. 2 also includes a buttressing semi-flexible member 11. Various methods of connecting the blade 3 to the bow saw 7 include riveting the connections 6,21 with a rivet (not shown) which then connects to the saw blades 3 and metal connections 6,21 welded to the bow 2 in a one piece invention.

In an alternate preferred embodiment and as shown in FIGS. 3 and 4, the connecting device 51 comprises a coil spring 53 such one found in a car strut or shock absorber. Though not shown, other single or multiple piece piston-like unit connecting devices, including but not limited to, hydraulic, pneumatic or other fluid-type, may be used to provide appropriate and evenly distributed cutting force in accordance with the present invention. As seen in FIG. 3, upper connection 59 and lower connection 61 are attached, and preferably welded onto the medial portion 63, or alternately (not shown) an end 65 of bow 67. Elongated handle 69 is attached to opposing end of connecting device 51, preferably via receiving threads in connecting device 51. The elongated handle 69 comprises an oval handle portion 71 having hand grips 73. It should be noted that the handle extension 57 of this embodiment may be attached at any angle relative to the blade 58.

As seen in FIG. 4, a first end 77 of coil spring 53 is connected, preferably welded, to the interior portion of hollow tube 75. Likewise, second end 79 of coil spring 53 is attached, preferably welded, to the interior portion of hollow tube 79. Such design allow connecting device 51 to expand and contract, while simultaneously maintaining rigidity sufficient to eliminate side-to-side movement of bow saw 55 shown in FIG. 3.

Accordingly, the present invention provides an improved bow saw having a bow, a blade, and an elongated handle extension comprising an elongated handle and contractable connecting device which is connected to the bow and which extends away from the bow at one of several angles relative to the line defined by the blade.

It is thus seen that the present invention allows the user to use the invention with a full body motion rather than with the motion of the arms to move a saw across the wood to be cut which makes the saw much easier to use and makes the cutting of wood less tiring to the person using the saw. The present invention additionally reduces side-to-side saw deviation. The person using the saw can also put more evenly distributed pressure on the saw blade, through-out the duration of each stroke, resulting in more wood being cut with each stroke of the blade. The connecting device of the present invention thus evenly distributes stroke force through-out each stroke. Therefore, cutting of wood is faster as well as less tiring to the user. It will also be evident to one skilled in the art that other objects are met by the forgoing description.

It will be understood that various details of the invention may be changed without departing from the scope of the invention. Furthermore, the foregoing section description is for the purpose of illustration only, and not for the purpose of limitation since the invention is limited by the claims.

I claim:

1. A bow saw comprising:
   a bow having a medial section and two ends, each of said ends connected to said medial section;
   a saw blade operably connected to each of said end to form a bow saw, said blade defining a reciprocal cutting direction;
   an elongated handle;
   connecting means operably connecting said handle to said bow, said means having reciprocal resilience in said reciprocal cutting direction, wherein said connecting means comprises a hydraulic cylinder.

* * * * *